United States Patent
Chung et al.

(10) Patent No.: US 7,287,117 B2
(45) Date of Patent: Oct. 23, 2007

(54) FLASH MEMORY AND MAPPING CONTROL APPARATUS AND METHOD FOR FLASH MEMORY

(75) Inventors: Tae-sun Chung, Seoul (KR); Hyung-seok Park, Seoul (KR); Myung-jin Jung, Seoul (KR)

(73) Assignee: Samsung Electronics Co. Ltd., Suwon (KR)

( * ) Notice: Subject to any disclaimer, the term of this patent is extended or adjusted under 35 U.S.C. 154(b) by 465 days.

(21) Appl. No.: 10/893,344

(22) Filed: Jul. 19, 2004

(65) Prior Publication Data

US 2005/0132127 A1    Jun. 16, 2005

(30) Foreign Application Priority Data

Dec. 10, 2003    (KR)    ............... 10-2003-0089817

(51) Int. Cl.
G06F 12/00 (2006.01)
(52) U.S. Cl. .................................................. 711/103
(58) Field of Classification Search ................ 711/103, 711/156; 365/185.33
See application file for complete search history.

(56) References Cited

U.S. PATENT DOCUMENTS

| | | | |
|---|---|---|---|
| 5,742,934 A * | 4/1998 | Shinohara .................... | 711/103 |
| 6,014,724 A | 1/2000 | Jenett | |
| 6,948,026 B2 * | 9/2005 | Keays ......................... | 711/103 |
| 2002/0041517 A1 | 4/2002 | Kim et al. | |
| 2003/0041210 A1 | 2/2003 | Keays | |

FOREIGN PATENT DOCUMENTS

| | | |
|---|---|---|
| CN | 1362708 A1 | 8/2002 |
| JP | 2001-521220 A | 11/2001 |
| JP | 2002-513484 A | 5/2002 |
| JP | 2002-366423 A | 12/2002 |
| JP | 2003-150441 A | 5/2003 |
| KR | 2001-0029171 A | 4/2001 |
| KR | 2002-0092487 A | 12/2002 |
| WO | WO98/24029 A1 | 6/1998 |
| WO | WO99/21093 A1 | 4/1999 |
| WO | WO 02/052416 A1 | 7/2002 |

* cited by examiner

*Primary Examiner*—Hiep T. Nguyen
(74) *Attorney, Agent, or Firm*—Sughrue Mion, PLLC

(57) ABSTRACT

A mapping algorithm for efficient access to a flash memory, wherein block state information that is changed through logical operations required by a processor is written in the flash memory according to a predetermined state transition algorithm and the changed information is referred to upon read/write operations. A mapping control apparatus for a flash memory according to the present invention includes a flash memory having regions divided on a block basis and containing block state information indicating the state of each block, each block including a predetermined number of sectors; and a processor for determining a sector on which a predetermined logical operation is to be performed based on the block state information and updating the block state information according to a predetermined state transition algorithm, when the logical operation is required for the flash memory.

27 Claims, 9 Drawing Sheets

F → M → S (1)     F → M (2)

F → M → S → O (1)     F → M → S (2)     F → M (3)

F → M → N → O (1)     F → M (2)

FLASH MEMORY AND MAPPING CONTROL APPARATUS AND METHOD FOR FLASH MEMORY

This application claims priority from Korean Patent Application No. 10-2003-0089817 filed on Dec. 10, 2003, in the Korean Intellectual Property Office, the disclosure of which is incorporated herein in its entirety by reference.

BACKGROUND OF THE INVENTION

1. Field of the Invention

The present invention relates to a flash memory and a mapping control apparatus and method for the flash memory, and more particularly, to enabling efficient access to a flash memory by updating block state information, which is changed through logical operations required by a processor, in the flash memory based on a predetermined state transition algorithm and referring to the updated information upon read/write operations.

2. Description of the Related Art

A flash memory has an advantage of RAM (Random Access Memory) which data can be written into and deleted from freely as well as that of ROM (Read Only Memory) that can maintain data stored therein without power. Therefore, flash memory has been widely used as a storage medium for portable electronic devices such as digital cameras, PDAs and MP3 players.

In such a flash memory, random access can be utilized for data stored in a specific location as in conventional RAMs, non-volatile storage devices, magnetic media and the like. However, the flash memory differs from existing storage devices in that access is gained on a block basis during the process of modifying or erasing data.

In other words, if previous data are intended to be modified or erased, it is required that a block containing the corresponding data be erased and data be then written again. As an example, it is performed in the same manner that an entire word is deleted completely by pressing the 'Delete' key and a modified word is then retyped instead of correcting a character or letter one-by-one.

As used herein, the term 'sector' refers to bytes having physically consecutive addresses. The sector is a basic unit of a read/write operation on a flash memory. A block including a plurality of sectors is a basic unit of a delete operation, which can be erased through a single erase operation.

Such a flash memory supports a logical-physical mapping method by which even though a physical address of a piece of data written in a flash memory is changed due to the erase-before-write, the piece of data written in the flash memory can be accessed with the same logical address.

That is, the mapping scheme manages information on mapping between a logical address and a physical address for a specific piece of data by means of a predetermined mapping table. The mapping scheme is classified roughly into a sector mapping method, a block mapping method, and a hybrid method.

FIG. 1A schematically illustrates an access architecture for a flash memory in accordance with a conventional sector mapping method.

As shown in FIG. 1A, the sector mapping method maintains mapping information on a sector basis in a flash memory to enable access to a physical sector of the flash memory using logical sector information.

As an example, if a logical sector number (LSN) is designated as 9 together with a request for a write operation of specific data, a flash memory access device searches for physical sector number (PSN) 6 corresponding to LSN 9 by referring to a mapping table.

Then, the relevant data are written in sector 6 of the flash memory. If other data have been written in this sector, the data are written in an empty physical sector of the flash memory and PSN corresponding to LSN 9 is changed in the mapping table.

FIG. 1B schematically illustrates an access architecture for a flash memory in accordance with a conventional block mapping method.

As shown in FIG. 1B, the block mapping method maintains mapping information on a block basis in a flash memory and translates logical sector information into logical block information, thereby enabling access to a physical sector of the flash memory using the logical block information and offset information.

As an example, if an LSN is designated as 9 together with a request for a write operation of specific data, a flash memory access device calculates a logical block number (LBN) (i.e., 9/4=2) for LSN 9 and then a physical block number (PBN) corresponding to LBN by referring to a mapping table.

In such a case, data are written in a sector corresponding to Offset 1 within PBN 1 obtained by matching the offset of the logical block with that of the physical block.

If other data have been written in this sector, the flash memory access device writes data in an empty physical sector of the flash memory while matching the offsets and then changes PBN corresponding to LBN 2 in the mapping table.

At this time, effective data remaining in the existing PBN should be copied to a new PBN while matching the offsets.

FIG. 1C schematically illustrates an access architecture for a flash memory in accordance with a conventional hybrid mapping method.

As shown in FIG. 1C, the hybrid mapping method performs mapping on a block basis units as in the block mapping method and then stores sector mapping information in a physical block to obtain the property of the sector mapping.

As an example, if an LSN is designated as 9 together with a request for a write operation of specific data, a flash memory access device calculates an LBN (i.e., 9/4=2) for LSN 9 and then obtains PBN 1 corresponding to the LBN by referring to a mapping table.

Thereafter, the flash memory access device writes data in an empty sector of PBN 1 and writes LSN 9.

Among these conventional mapping methods, the sector mapping method has difficulty in being practically applied to flash memories since there is a great deal of mapping information required for maintenance on the sector basis in the flash memory.

Accordingly, recent technologies are based on the block mapping method that requires less mapping information.

However, since the offsets should be matched in the block mapping method, a new block should be allocated to write data in the same sector and even effective data of a different sector in the same block as well as those of the relevant sector should be copied if write operations frequently occur in the same sector. Thus, there is a problem in that write and erase operations frequently occur, resulting in considerable deterioration of the performance of the system.

Meanwhile, although the hybrid mapping method does not require matching of the offsets due to storage of the sector mapping information after block mapping has occurred, it has a problem in that a predetermined memory capacity for writing the sector mapping information should be secured and thus the required amount of memory increases compared to the block mapping method.

To solve the aforementioned problems in the prior art, Korean Laid-Open Patent Publication No. 2002-0092487 entitled "Method of Managing Flash Memory" that was previously proposed discloses prevention of degradation of the performance of a system even in an environment where data are frequently updated by allocating a specific log block and writing data, which require a write operation during an updating process, in the log block. However, the invention of the publication is not sufficient to prevent the performance of the flash memory system from deteriorating due to repeated write operations since write/erase operations are required during the process of transferring the data written in the log block to a data block.

Therefore, there is a need for a method of accessing a flash memory, which enables improvement of the performance of a flash memory system by reducing the number of write/erase operations involved in write operations requested by a processor.

SUMMARY OF THE INVENTION

Accordingly, the present invention is conceived to solve the aforementioned problems. A primary object of the present invention is to provide a mapping algorithm for efficient access to a flash memory, wherein block state information that is changed through logical operations required by a processor is written in the flash memory according to a predetermined state transition algorithm and the changed information is referred to upon read/write operations.

Another object of the present invention is to enable access to a flash memory using a flash memory access method through the existing block mapping algorithm without matching offsets.

A further object of the present invention is to improve the overall performance of a flash memory system by minimizing erase operations through state information using a state transition algorithm.

The present invention is directed to determination of a sector on which a logical operation is to be performed during a predetermined logical operation for a flash memory, based on block state information indicating the state of a block, and access to the determined sector.

Further, the present invention is directed to updating the block state information, which is changed based on the results of access to the determined sector, according to a predetermined state transition algorithm.

In the present invention, the state transition algorithm represents the state of a block that is changed by a predetermined logical operation. The state of a block includes a first state in which data are not written in the block; a second state in which predetermined data are written in the first state while matching sector offsets; a third state in which predetermined data are written in the first state without matching of the sector offsets; a fourth state in which the data in the second state are written in the entire block; and a fifth state in which effective data in the third or fourth state are transferred to a new block and thus data written in a previous block are not effective any longer.

Hereinafter, for description of the configuration and operation of the present invention in connection with an embodiment, the first state is defined as Free (hereinafter, referred to as "F"), the second state as M, the third state as N, the fourth state as Source (hereinafter, referred to as "S"), and the fifth state as Old (hereinafter, referred to as "O"). Blocks containing the corresponding block state information are defined as Block F, Block M, Block N, Block S and Block O, respectively.

According to an aspect of the present invention, there is provided a flash memory comprising regions divided on a block basis, each block including a predetermined number of sectors, wherein the flash memory contains block state information that indicates the state of each block and is used in determining a sector on which a logical operation is to be performed.

According to another aspect of the present invention, there is provided a mapping control apparatus for a flash memory, comprising a flash memory which comprises regions divided on a block basis and contains block state information indicating the state of each block, each block including a predetermined number of sectors; and a processor for determining a sector on which a predetermined logical operation is to be performed based on the block state information and updating the block state information according to a predetermined state transition algorithm, when the logical operation is required for the flash memory.

According to a further aspect of the present invention, there is provided a mapping control method for a flash memory, comprising the steps of, if a predetermined logical operation is required on a specified logical sector of the flash memory, searching for a physical block corresponding to the logical sector by referring to a mapping table; determining a sector on which the logical operation is to be performed, based on block state information of the physical block; and accessing the determined sector to perform the logical operation.

BRIEF DESCRIPTION OF THE DRAWINGS

The above and other objects, features and advantages of the present invention will become apparent from the following description of exemplary embodiments in conjunction with the accompanying drawings, in which.

DETAILED DESCRIPTION OF THE INVENTION

Hereinafter, a flash memory, and a mapping control apparatus and method for the flash memory according to the present invention will be described in detail with reference to the accompanying drawings.

First, The configuration and operation of a flash memory based system comprising a flash memory and a mapping control apparatus for the flash memory according to the present invention will be described in detail in connection with embodiments with reference to the accompanying drawings.

Figure 1A:
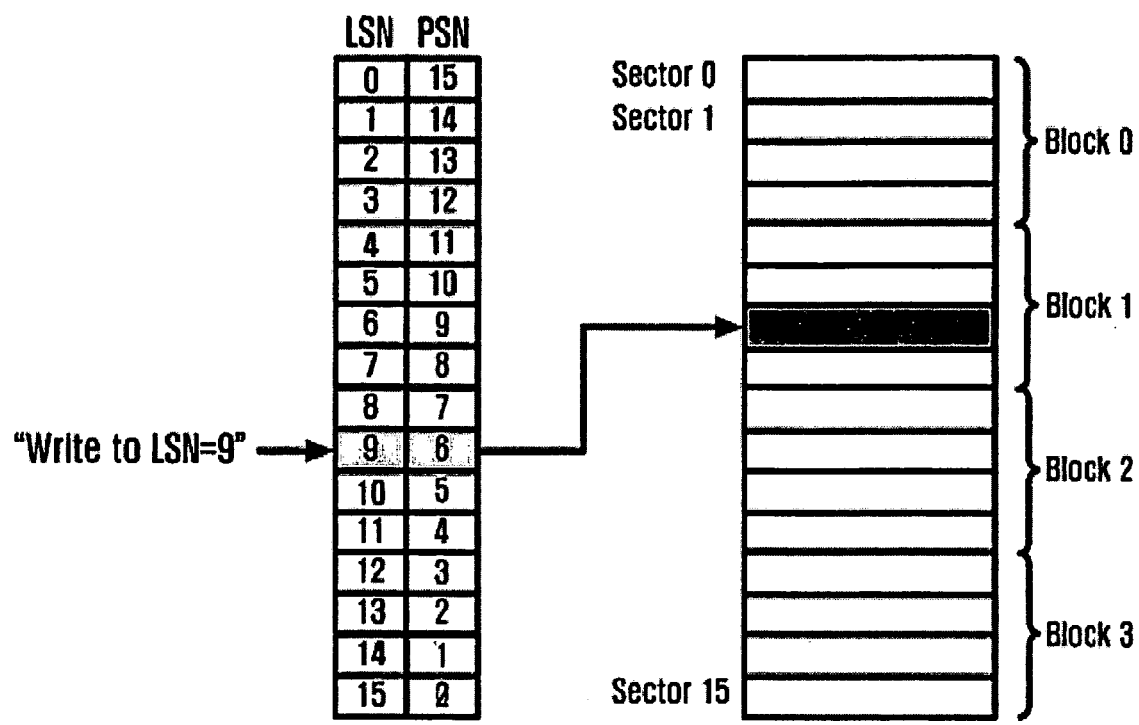
FIGS. 1A to 1C are block diagrams of a flash memory illustrating operation processes according to control schemes in conventional methods for accessing the flash memory, respectively.
Figure 1B:
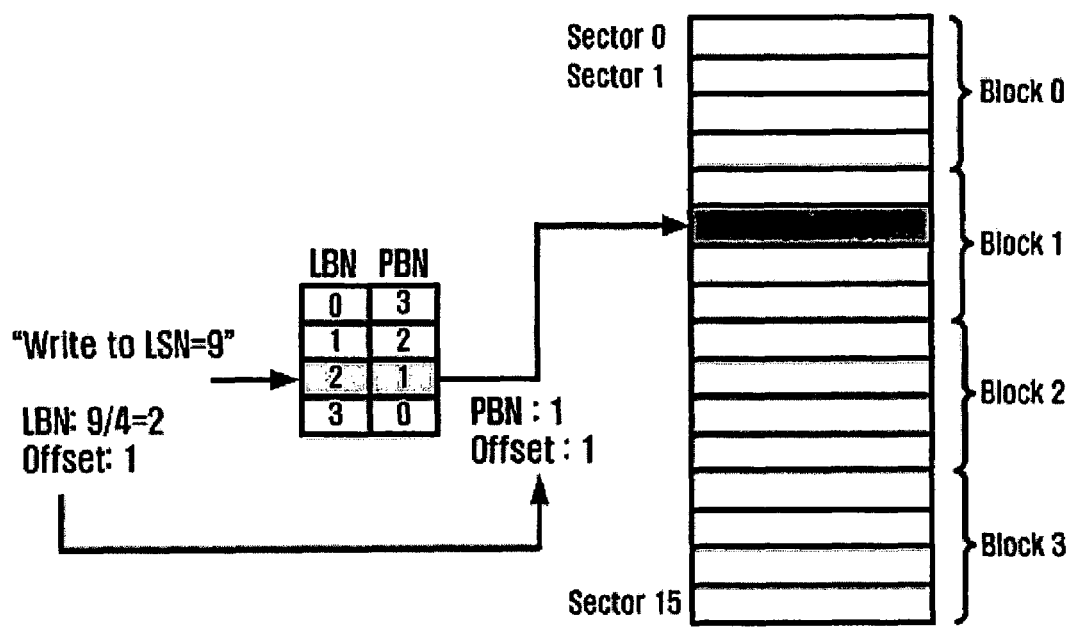
Figure 1C:
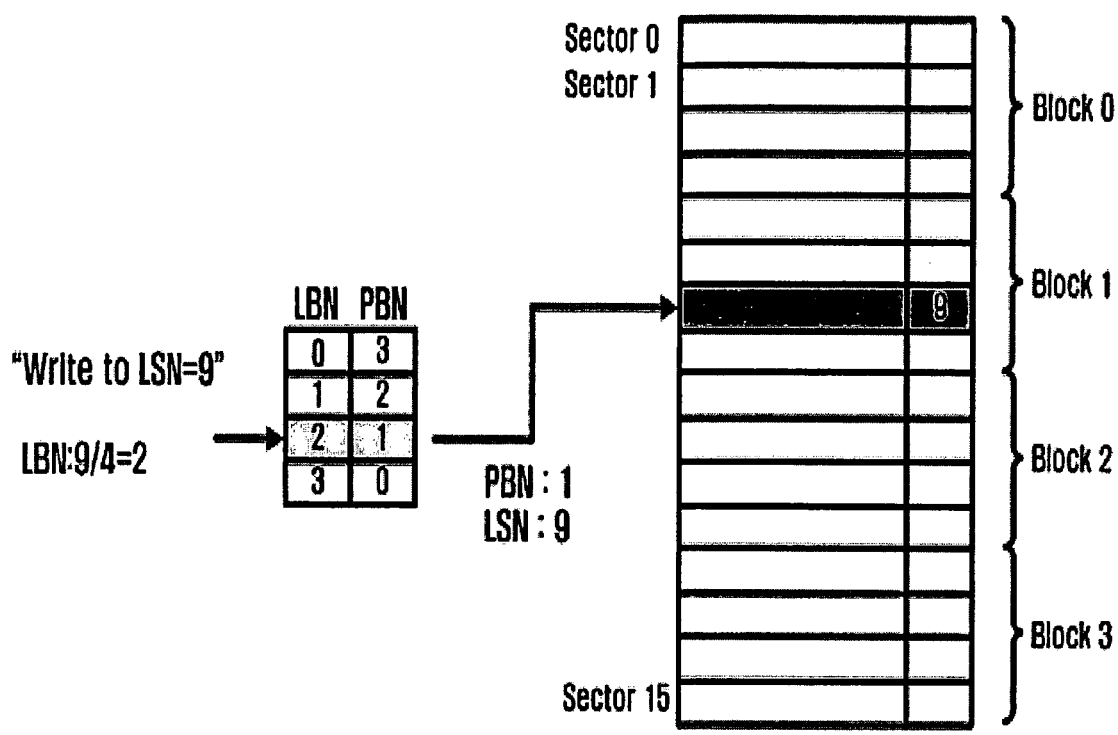
Figure 2:
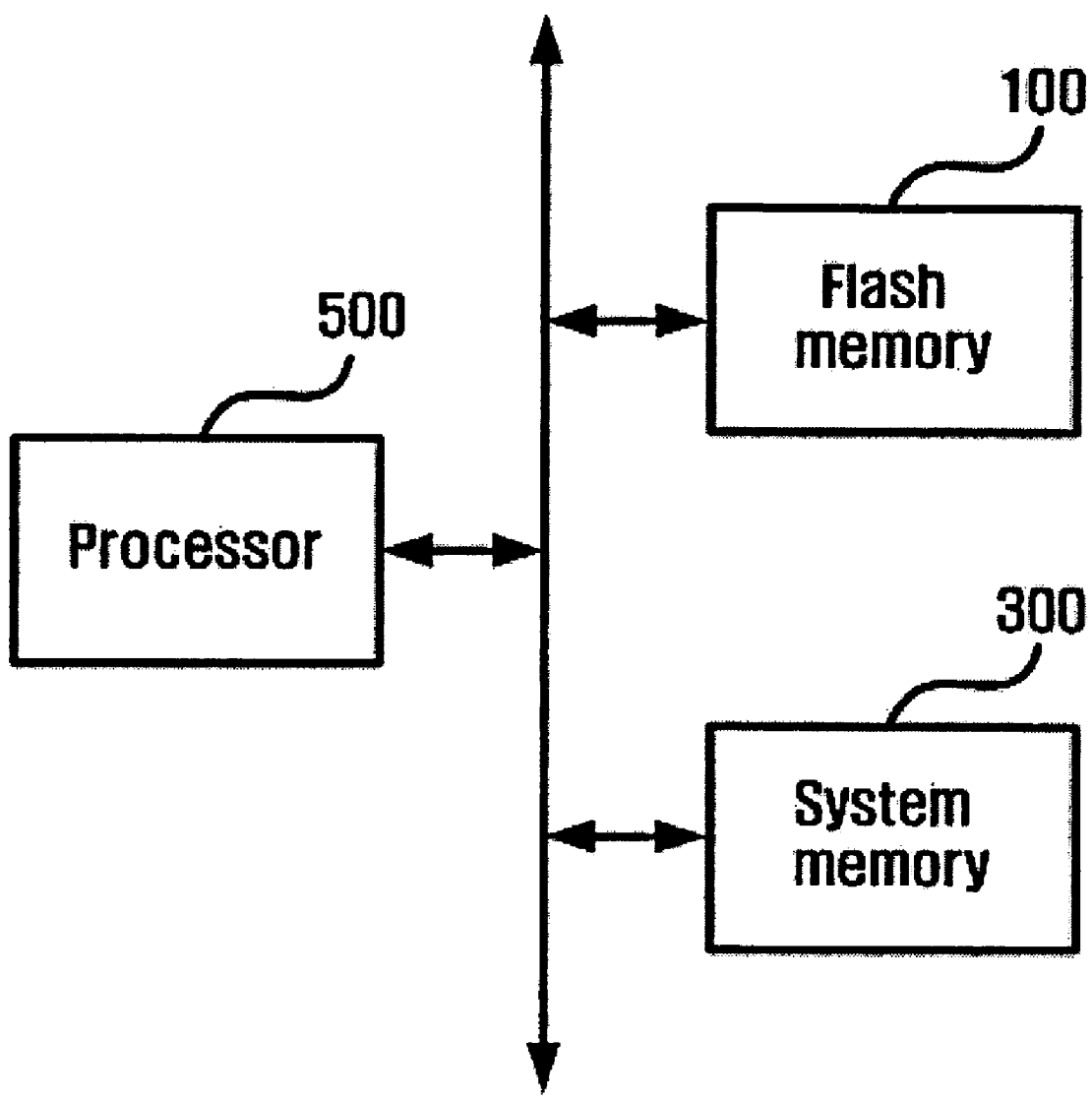
FIG. 2 is a diagram schematically illustrating a flash memory based system according to an embodiment of the present invention.

FIG. 2 is a diagram schematically illustrating a flash memory based system according to an embodiment of the present invention.

As shown in FIG. 2, the system comprises a flash memory 100, a system memory 300 and a processor 500.

The flash memory 100 comprises blocks each of which is a basic unit of an erase operation. Each block contains a plurality of sectors each of which is a basic unit of a write/read operation.

Further, the flash memory 100 contains block state information indicating the state of each block, which is used in determining a sector on which a logical operation such as a write or read operation is to be performed.

The block state information is written in a meta-block where information on the flash memory 100 is written, or in a predetermined region (e.g., spare region) allocated among storage regions of each block.

The system memory 300 contains access codes for access to the flash memory. A memory capable of supporting eXecute-In-Place (XIP) such as RAM or ROM is used as the system memory.

The processor 500 accesses the flash memory 100 using the flash memory access codes written in the system memory 300. If a predetermined logical operation is required, the processor 500 translates a logical sector address into a physical block address for use in accessing the flash memory and determines a sector on which a logical operation is to be performed based on block state information on a relevant block corresponding to the physical block address, thereby performing the logical operation.

Furthermore, if a predetermined logical operation is required, the processor 500 determines block state information of each block, which is changed by the logical operation according to a predetermined state transition algorithm, and updates block state information on a relevant block, which is written in the flash memory 100, based on the determined block state information.

According to respective block state information, blocks are classified into block F in which data are not written in the block; block M in which predetermined data are written in block F by matching sector offsets; block N in which predetermined data are written in block M without matching of sector offsets; block S in which the data of block M are written in the entire block; and block O in which effective data in block N or S are transferred to a new block and thus data written in a previous block are not effective any longer.

The state transition algorithm carries out a swap merge operation by which if block M is being fully used, an additional block F is allocated to perform a newly required write operation, a transition of the existing block M to block S is made and new data are then written in block F.

Further, the state transition algorithm carries out a smart merge operation by which if block N is being fully used, an additional block F is allocated to perform a newly required write operation, only effective data among data written in the existing block N are written in block F and a transition of the existing block N to block O is made.

The data written in new block F according to the smart merge operation, a transition of block F to block M is made as sector offsets are matched, and a transition of block O to block F is made by a predetermined erase operation.

Figure 3:
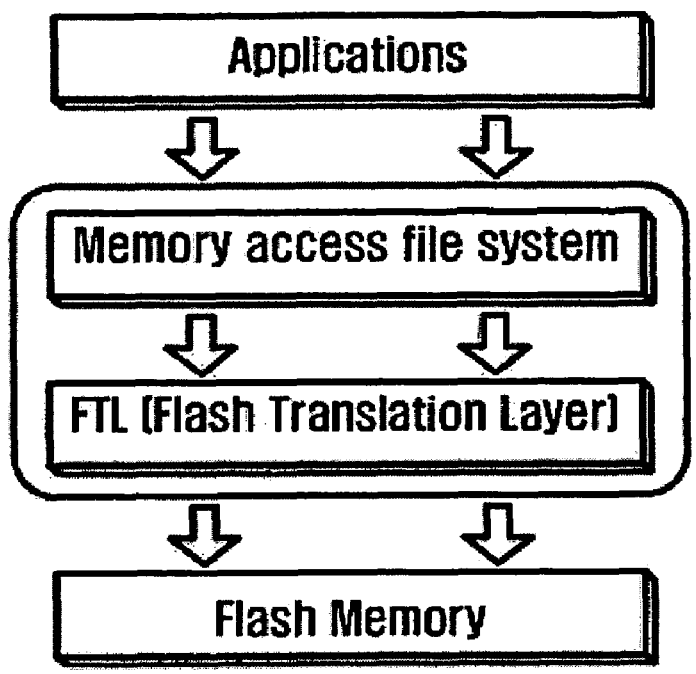
FIG. 3 is a diagram schematically illustrating a software architecture for the flash memory based system according to the embodiment of the present invention.

FIG. 3 is a diagram schematically illustrating a software architecture for the flash memory based system according to the embodiment of the present invention.

As shown in FIG. 3, the software architecture according to the present invention roughly comprises an application program module (Applications) for performing a logical operation for a specific file depending on a file system of the flash memory based system, a mapping control device module for a flash memory which accesses data in the flash memory required by a logical operation performed in the application program module, and a flash memory module (Flash Memory) for writing or reading relevant data in response to access control by the mapping control device.

The mapping control device module for the flash memory comprises a file system that accesses a flash memory by accessing a flash memory module according to the logical operation required by the application program module, and a flash translation layer (FTL) that translates a given logical sector number (LSN) into a physical address which is an actual address in the flash memory to enable access to the flash memory with the file system.

Figure 4:
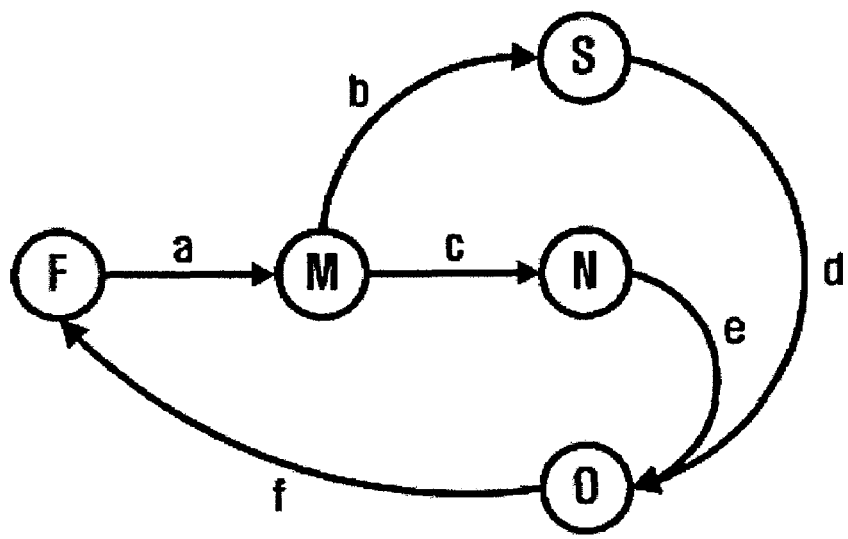
FIG. 4 is a diagram schematically illustrating a state transition process in a state transition algorithm according to an embodiment of the present invention.

FIG. 4 is a diagram schematically illustrating a state transition process in a state transition algorithm according to an embodiment of the present invention.

As shown in FIG. 4, the state transition process for a specific block of the flash memory 100 begins with block F in which no data are written.

If the processor 500 requests a write operation on block F, the processor 500 determines a sector on which a write operation is to be performed. When a sector offset of data required to be written is matched, the processor 500 makes a transition of the block state information from block F to block M (a).

A transition of block M to block S or N is made according to the write operation by the processor 500. In other words, if there is no sector available for a write operation within block M due to repeated write operations for data having a matched sector offset, a swap merge operation is performed to allocate an additional block F and causes a transition of block M to block S (b).

Further, if it is required to perform a write operation on a sector of block M in which data has been already written, the processor 500 determines an arbitrary sector as a sector on which a write operation is to be performed, makes a transition of the block state information from block M to block N (c), and then writes data in the determined sector.

If the data of block S are no longer effective, the processor 500 makes a transition of the block state information from block S to block O (d).

In addition, if there is no sector available for a write operation within block N due to repeated write operations of data having no matched sector offset, a smart merge operation will be performed to write only effective data into a newly allocated block F and transition the block state information from a block N to a block O (e).

A transition of block O to block F is made as a result of a predetermined erase operation by the processor 500 (f).

For reference, in the flash memory and the mapping control apparatus for the flash memory according to an embodiment of the present invention, all or some of modules may be implemented with hardware or software, or some of the modules may be implemented with software.

Therefore, it will be apparent that implementation of the flash memory and the mapping control apparatus for the flash memory according to an embodiment of the present invention with hardware or software falls within the spirit of the present invention, and various modifications and changes may be made to the implementation thereof with hardware and/or in software without departing from the spirit of the present invention.

A mapping control method for a flash memory by which the flash memory is accessed using the flash memory based system according to the present invention will be described in detail in connection with an embodiment with reference to the accompanying drawings.

In describing the mapping control method for the flash memory according to the present invention, a description of an initialization process will be omitted since it is the same as the existing process.

Accordingly, a write operation process through the mapping control method according to the present invention will be first described, and a read operation process through the mapping control method will be then described.

1. Write Operation Process

Figure 5:
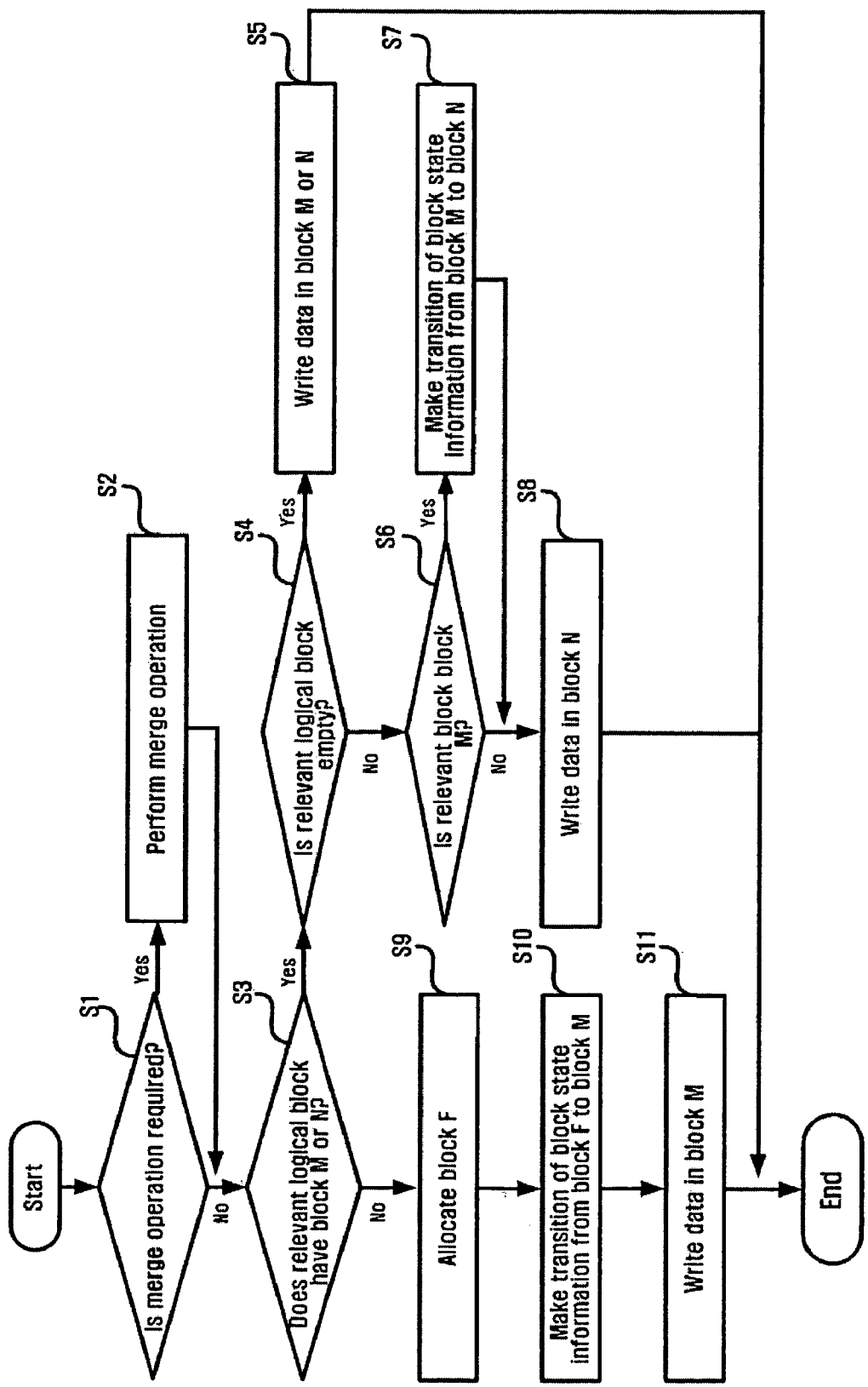
FIG. 5 is a flowchart schematically illustrating a write operation process according to an embodiment of the present invention.

FIG. 5 is a flowchart schematically illustrating a write operation process according to an embodiment of the present invention.

As shown in FIG. 5, if a write operation is required on data having a specific logical sector number, the processor 500 first calculates a logical block number (hereinafter, referred to as "logical block") based on the specified logical sector number (hereinafter, referred to as "logical sector").

Then, the processor 500 searches for a physical block number (hereinafter, referred to as "physical block") corresponding to the calculated logical block through a mapping table obtained during the initialization process, and determines whether a merge operation is required or not from block state information on the relevant physical block (S1).

That is, if there is no sector available for a write operation in the relevant physical block due to repeated write operations on the relevant physical block, it will be determined whether a swap or smart merge operation is required to allocate a new block in which data are to be written.

If it is determined that a merge operation is required, the merge operation is performed according to the property of the relevant physical block (S2).

In other words, if the current state of the relevant physical block, which is written in the mapping table, is block M, the processor 500 performs a swap merge operation for making a transition from block M to block S. If the current state of the relevant physical block is block N, the processor 500 performs a smart merge operation by which new block F is allocated, only effective data in block N are detected and written, and a transition of block F to block M is made.

If it is determined that a merge operation is not required or a merge operation is performed, the processor 500 determines whether the logical block on which a write operation is required has a block M or block N through the mapping table (S3).

If it is determined that the logical block has a block M or block N, the processor 500 searches block M or N to find a sector matched with offset information of data on which a write operation is required, and determines whether the relevant sector is empty (S4).

If it is determined that the relevant sector is empty, the processor 500 writes the data on which a write operation is required in the relevant sector (S5). If it is determined that the relevant sector is not empty, the processor determines whether the relevant block is block M (S6).

If it is determined that the relevant block is block M, a transition of block state information on the relevant physical block to block N is made (S7). If it is determined that the relevant block is not block M or a transition of the block state information is made from block M to block N, the processor 500 selects an arbitrary sector in block N and writes data without matching of the sector offsets (S8).

If it is determined that the logical block does not have block M or N, the processor 500 allocates a new block F (S9) in which data are to be written since no data have been written in the physical block corresponding to the calculated logical block or a merge operation has been performed.

Next, the processor 500 makes a transition of the allocated block F to block M (S10), and writes data, which are required to be subjected to a write operation, in block M while matching the sector offsets (S11).

2. Read Operation Process

Figure 6:
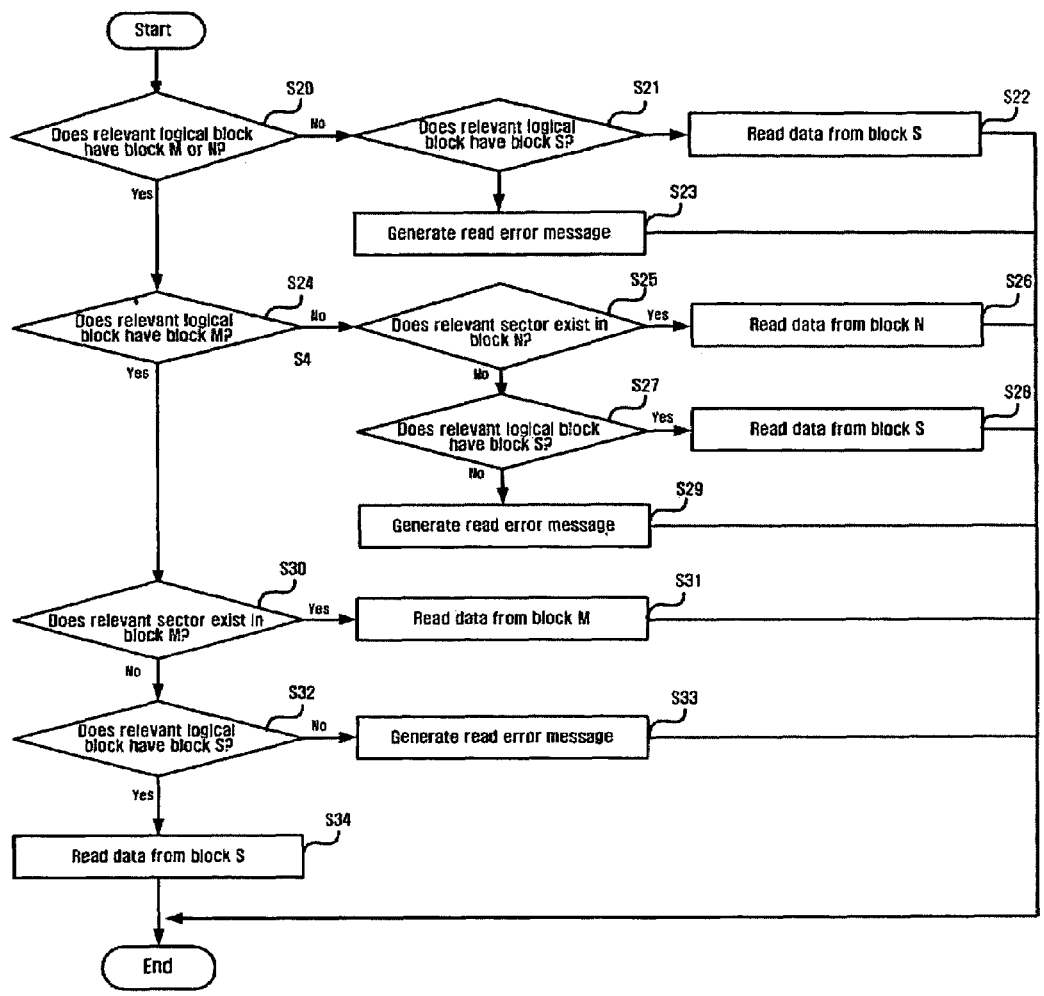
FIG. 6 is a flowchart schematically illustrating a read operation process according to an embodiment of the present invention.

FIG. 6 is a flowchart schematically illustrating a read operation process according to an embodiment of the present invention.

As shown in FIG. 6, if a read operation is required on data having a specific logical sector number, the processor 500 first calculates a logical block based on the specified logical sector.

Next, the processor 500 searches for a physical block corresponding to the logical block calculated through the mapping table obtained during the initialization process, and determines whether the logical block on which a read operation is required has block M or N (S20).

If it is determined that the logical block does not have block M or N, the processor 500 determines whether the logical block has block S through the mapping table (S21).

If it is determined that the logical block has block S, the processor 500 searches block S to find a sector matched with offset information of data on which a read operation is required, and reads out data written in the relevant sector (S22).

If it is determined that the logical block does not have block S, the processor 500 determines that the data on which a read operation is required do not exist in the flash memory 100 and generates a read error message (S23).

If it is determined that the logical block has block M or N, the processor 500 determines whether a physical block corresponding to the logical block has block M (S24).

If it is determined that the physical block corresponding to the logical block does not have block M, the processor 500 determines whether a sector corresponding to the logical sector on which a read operation is required exists in block N (S25).

If it is determined that the relevant sector exists in block N, the processor 500 reads out data which are written in the relevant sector of block N (S26). If it is determined that the relevant sector does not exist in block N, the processor determines whether the physical block corresponding to the logical block has block S (S27).

If it is determined that the physical block corresponding to the logical block has block S, the processor 500 reads out data which are written in the relevant sector (S28). If it is determined that the physical block corresponding to the logical block does not have block S, the processor determines that data on which a read operation is required does not exist in the flash memory 100 and generates a read error message (S29).

If it is determined that the physical block corresponding to the logical block is block M, the processor 500 determines whether a sector on which a read operation is required exists in block M (S30).

If it is determined that the relevant sector exists in block M, the processor 500 reads out data from the relevant sector of block M (S31). If it is determined that the relevant sector does not exist in block M, the processor determines whether the logical block on which a read operation is required has block S (S32).

If it is determined that the logical block does not have block S, the processor 500 determines that data on which a read operation is required does not exist in the flash memory 100, and generates a read error message (S33).

If it is determined that the logical block has block S, the processor 500 searches block S to find a sector matched with offset information of data on which a read operation is required, and reads out the data which are written in the relevant sector (S34).

The flash memory, and the mapping control apparatus and method for the flash memory according to the embodiments of the present invention will be described in detail by way of example with reference to the accompanying drawings.

Figure 7:
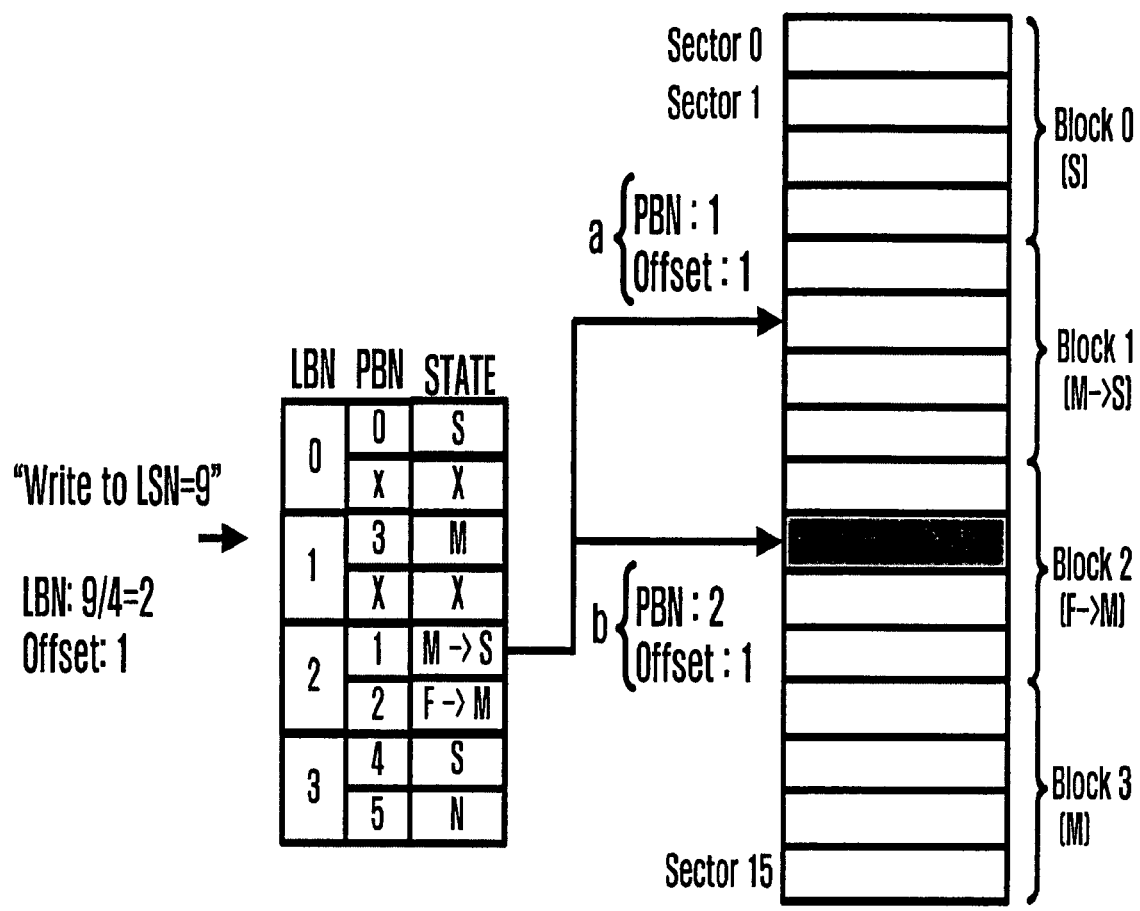
FIG. 7 is a diagram schematically illustrating a write operation process using a mapping table according to an embodiment of the present invention.

FIG. 7 is a diagram schematically illustrating a write operation process using a mapping table according to an embodiment of the present invention.

In the mapping table according to the present invention, a logical block corresponds to up to two physical blocks, and the two physical blocks may be a combination of block S and block M or N.

As shown in FIG. 7, if a write operation is required on data in logical sector 9 (LSN=9), the processor 500 calculates a logical block and an offset value of logical block 9 (LBN: 9/4=2; Offset: 1).

In this case, the processor 500 searches for a physical block corresponding to the logical block (LBN=2) calculated by referring to the mapping table, and the state of the physical block (a).

Next, the processor 500 determines whether a merge operation is required, based on the block state information of the relevant physical block.

If the relevant physical block is block 1 and has data written in all sectors thereof to be block M, the processor 500 makes a transition from block M to block S and performs a swap merge operation by which block F for use in writing data is allocated.

If physical block 2 (PBN=2) is allocated as a new block F through the swap merge operation, the processor 500 writes data, which are required to be subjected to a write operation, in newly allocated physical block 2 while matching the offset values, and updates a physical block and state information corresponding to the logical block (LBN=2) in the mapping table.

In other words, the processor 500 updates the block state of the physical block (PBN=1) for the logical block (LBN=2) in the mapping table from M to S (M→S), and the block state of the newly allocated physical block (PBN=2) from F to M (F→M).

Figure 8A:
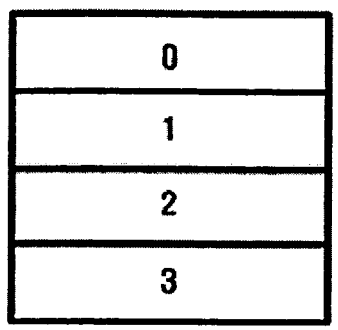
FIGS. 8A to 8C are diagrams illustrating block transition processes in a flash memory according to an embodiment of the present invention.
Figure 8A:
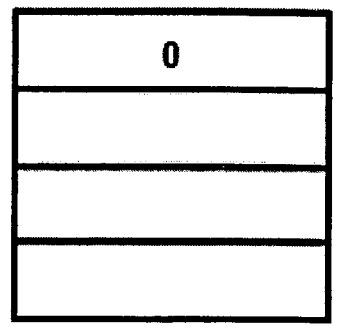

As an example, when one block of the flash memory 100 comprises four sectors as shown in FIG. 8A, the processor 500 calculates a logical block from a specific logical sector if a write operation is required on the specific logical sector in order of sector offsets of 0, 1, 2, 3 and 0.

Next, the processor 500 searches for a physical block corresponding to the logical block calculated by referring to a mapping table, and identifies the block state information of the searched physical block to determine a sector on which a write operation is to be performed according to the block state information.

If the relevant physical block is block F, the processor 500 writes data in the relevant physical block according to the offset information.

Specifically, the processor 500 makes a transition of the block state information from block F to block M, and then writes data in each sector of the relevant physical block in order of 0, 1, 2, 3 and 0 of sector offsets.

In this case, since one block comprises four sectors, there is no sector available for a write operation in the relevant block if data are written in sectors 0, 1, 2 and 3. Thus, the processor 500 allocates an additional block F through a swap merge operation and makes a transition of the block state information from block M to block S (1).

Next, the processor 500 makes a transition of the block state information of the additionally allocated block F from block F to block M, and then writes data having a sector offset of 0 in the relevant sector (2).

Figure 8B:
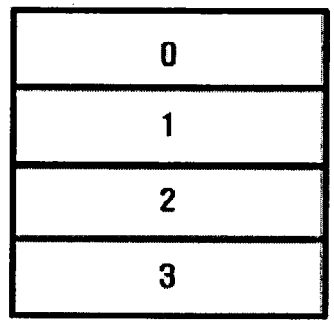
Figure 8B:
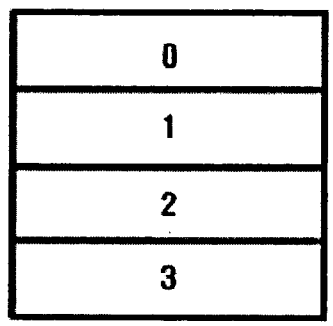
Figure 8B:
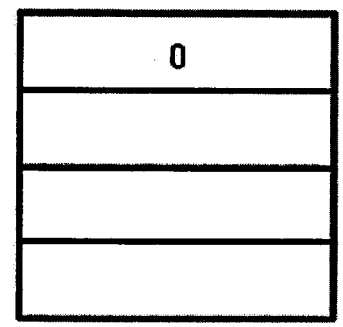

As another example, as shown in FIG. 8B, the processor 500 calculates a logical block from a logical sector in a case where a write operation is required on a specific logical sector in order of sector offsets of 0, 1, 2, 3, 0, 1, 2, 3 and 0.

Next, the processor 500 searches for a physical block corresponding to the logical block calculated by referring to a mapping table, and identifies the block state information of the searched physical block to determine a sector on which a write operation is to be performed according to the block state information.

If the relevant physical block is block F, the processor 500 writes data in the relevant physical block according to the offset information.

Specifically, the processor makes a transition of the block state information from block F to block M, and then writes data in each sector of the relevant physical block in order of sector offsets of 0, 1, 2, 3, 0, 1, 2, 3, and 0.

In this case, since one block comprises four sectors, there is no sector available for a write operation in the relevant block if data are written in sectors 0, 1, 2 and 3. Thus, the processor 500 allocates an additional block F through a swap merge operation and makes a transition of the block state information from block M to block S (1).

Next, the processor 500 makes a transition of the block state information of the additionally allocated block F from block F to block M, and then writes data having sector offsets of 0, 1, 2 and 3 in the additionally allocated block M.

Thereafter, since there is no sector available for a write operation in the relevant block and the data in block S are no longer effective, the processor 500 makes a transition of the block state information of block S from block S to block O, allocates an additional block F through a swap merge operation, and makes a transition of the block state information of the previously additionally allocated block from block M to block S (2).

Then, the processor 500 again makes a transition of the block state information of the additionally allocated block F from block F to block M, and then writes data having a sector offset of 0 in the relevant sector (3).

Figure 8C:
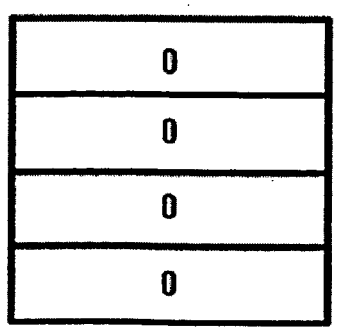
Figure 8C:
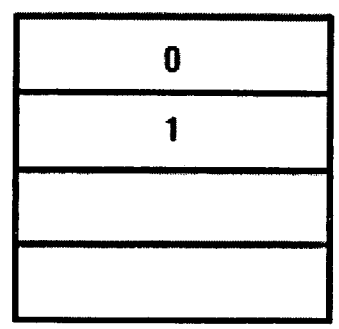

As a further example, as shown in FIG. 8C, the processor 500 calculates a logical block from theological sector in a case where a write operation is required on a specific logical sector in order of sector offsets of 0, 0, 0, 0 and 1.

Next, the processor 500 searches for a physical block corresponding to the logical block calculated by referring to a mapping table, and identifies the block state information of the searched physical block to determine a sector on which a write operation is to be performed according to the block state information.

If the relevant physical block is block F, the processor 500 writes data in the relevant physical block according to the offset information.

That is, the processor 500 makes a transition of the block state information from block F to block M and then writes data in each sector of the relevant physical block in order of sector offsets of 0, 0, 0, 0 and 1.

In this case, since data have been already written in the relevant sector of the physical block during the process of performing a second write operation, the processor 500 makes a transition of the block state information of the physical block from block M to block N, selects an arbitrary sector and writes data on which a write operation is required in the selected sector.

In this way, if write operations in which sector offsets are not matched are repeated and thus there is no sector available for a write operation in the relevant physical block, the processor 500 allocates an additional block F through a swap merge operation and makes a transition from block M to block O (1).

Next, the processor 500 makes a transition of the block state information of the additionally allocated block F from block F to block M, detects only effective data among data written in block N and writes them in the relevant sector of block M.

In other words, only the last written piece of data is read among data having a sector offset of 0 written in block O and is then written in sector 0 of the additionally allocated block M. Further, the data having a sector offset of 1 are written into a relevant sector (2).

According to the present invention, in performing a write/read operation required for a logical sector in a flash memory, a sector on which the relevant operation is to be performed is determined through a predetermined state transition algorithm, thereby minimizing erase operations required for a write operation on a specific logical block and maximizing the performance of a flash memory system.

Although the present invention has been described in detail in connection with the embodiments shown in the drawings, they are merely illustrative. It will be understood by those skilled in the art that various modifications and equivalents thereof may be made thereto without departing from the spirit and scope of the present invention. Therefore, the scope of the present invention should be defined by the appended claims.

What is claimed is:

1. A flash memory, comprising:
    a plurality of blocks, each block including a plurality of sectors,
    wherein if a logical operation to a logical sector address is requested, a physical block is determined based on the logical sector address, and a specific sector on which the logical operation is to be performed is determined based on state information of the physical block.

2. The flash memory as claimed in claim 1, wherein the state information is determined according to a state transition algorithm.

3. The flash memory as claimed in claim 1, wherein the state information is written in the physical block or a meta-block where information on the flash memory are written.

4. A flash memory comprising:
    regions divided into a plurality of blocks, each block including a predetermined number of sectors;
    wherein the flash memory contains block state information that indicates a state of each block and is used in determining a specific sector on which a logical operation is to be performed;
    wherein the block state information is determined according to a predetermined state transition algorithm; and
    wherein the indicated state is at least one of
    a first state in which data are not written in the block;
    a second state in which predetermined data are written while matching sector offsets in the first state;
    a third state in which predetermined data are written without matching of the sector offsets in the first state;
    a fourth state in which the data in the second state are written in the entire block; and
    a fifth state in which effective data in the third or fourth state are transferred to a new block and thus the data written in a previous block are not effective any longer.

5. The flash memory as claimed in claim 4, wherein the state transition algorithm carries out a swap merge operation by which an additional block in the first state is allocated to perform a write operation newly required in the fourth state.

6. The flash memory as claimed in claim 4, wherein if all sectors of a relevant block are used in the third state, the state transition algorithm carries out a smart merge operation by which an additional block in the first state is allocated to perform a newly required write operation and only effective data are detected among data written in the previous block and are then written in the allocated additional block.

7. The flash memory as claimed in claim 6, wherein the smart merge operation is performed by making a transition of block state information of the allocated block from the first state to the second state and block state information of the previous block from the third state to the fifth state, if effective data are written.

8. The flash memory as claimed in claim 4, wherein an erase operation makes a transition of the fifth state to the first state.

9. A mapping control apparatus for a flash memory, comprising:
    a flash memory which comprises a plurality of blocks each block including a plurality of sectors; and
    a processor operable to determine a physical block based on a logical sector address in a requested logical operation to the logical sector address, and a specific sector on which the logical operation is to be perform based on state information of the physical block, and update the state information according to a state transition algorithm.

10. The apparatus as claimed in claim 9, wherein the state information is written in the physical block or a meta-block where information on the flash memory are written.

11. The apparatus as claimed in claim 9, wherein the processor writes data in the sector determined according to the requested logical operation or reads data from the sector, and erases non-effective data in a block through an erase operation based on the updated state information.

12. A mapping control apparatus for a flash memory, comprising:
    a flash memory which comprises regions divided into a plurality of blocks and contains block state information indicating a state of each block, each block including a predetermined number of sectors; and
    a processor operable to determine a sector on which a predetermined logical operation is to be performed based on the block state information and update the block state information according to a predetermined state transition algorithm, when the logical operation is required for the flash memory;

wherein the state of a particular block includes at least one of a first state in which data are not written in the block;

a second state in which predetermined data are written while matching sector offsets in the first state;

a third state in which predetermined data are written without matching of the sector offsets in the first state;

a fourth state in which the data in the second state are written in the entire block; and a fifth state in which effective data in the third or fourth state are transferred to a new block and thus the data written in the previous block are not effective any longer.

13. The apparatus as claimed in claim 12, wherein the state transition algorithm carries out a swap merge operation by which an additional block in the first state is allocated to perform a write operation newly required in the fourth state.

14. The apparatus as claimed in claim 12, wherein if all sectors of a relevant block are used in the third state, the state transition algorithm carries out a smart merge operation by which an additional block in the first state is allocated to perform a newly required write operation and only effective data are detected among data written in the previous block and are then written in the allocated block.

15. The apparatus as claimed in claim 14, wherein the smart merge operation is performed by making a transition of block state information of the allocated block from the first state to the second state and block state information of the previous block from the third state to the fifth state, if effective data are written.

16. The apparatus as claimed in claim 12, wherein an erase operation makes a transition of the fifth state to the first state.

17. A mapping control method for a flash memory, comprising:

if a logical operation is required on a specified logical sector of the flash memory, determining a first physical block corresponding to the logical sector by referring to a mapping table;

determining a sector on which the logical operation is to be performed, based on state information of the first physical block; and accessing the determined sector to perform the logical operation;

wherein the first physical block includes a plurality of sectors.

18. The method as claimed in claim 17, further comprising:

searching for a second physical block corresponding to a logical block;

calculating a second logical block from the logical sector; and searching for a third physical block corresponding to the calculated second logical block through the mapping table.

19. The method as claimed in claim 17, wherein the step of determining the sector on which the logical operation is to be performed comprises:

selecting a sector having a matched sector offset, based on the state information of the first physical block.

20. The method as claimed in claim 17, wherein the step of determining the sector on which the logical operation is to be performed comprises:

selecting a sector having a non-matched sector offset, based on the state information of the first physical block.

21. The method as claimed in claim 17, wherein the step of accessing the determined sector to perform the logical operation comprises:

determining the state information of the first physical block, which is changed by the logical operation, through a state transition algorithm; and updating the state information of the first physical block based on the determined state information.

22. The method as claimed in claim 17, wherein the state information is written in the first physical block or a meta-block where information on the flash memory are written.

23. A mapping control method for a flash memory, the method comprising if a predetermined logical operation is required on a specified logical sector of the flash memory, determining a first physical block corresponding to the logical sector by referring to a mapping table;

determining a sector on which the logical operation is to be performed, based on block state information of the first physical block; and accessing the determined sector to perform the logical operation, wherein the step of accessing the determined sector to perform the logical operation comprises determining the block state information of the first physical block, which is changed by the logical operation, through a predetermined state transition algorithm; and updating the block state information of the first physical block based on the determined block state information; and wherein the state includes at least one of a first state in which data are not written in the first block;

a second state in which predetermined data are written while matching sector offsets in the first state;

a third state in which predetermined data are written without matching of the sector offsets in the first state;

a fourth state in which the data in the second state are written in the entire first physical block; and a fifth state in which effective data in the third or fourth state are transferred to a new block and thus the data written in the first physical block are not effective any longer.

24. The method as claimed in claim 23, wherein the state transition algorithm carries out a swap merge operation by which an additional block in the first state is allocated to perform a write operation newly required in the fourth state.

25. The method as claimed in claim 23, wherein if all sectors of a relevant block are used in the third state, the state transition algorithm carries out a smart merge operation by which an additional block in the first state is allocated to perform a newly required write operation and only effective data are detected among data written in the first physical block and are then written in the allocated block.

26. The method as claimed in claim 25, wherein the smart merge operation is performed by making a transition of block state information of the allocated block from the first state to the second state and block state information of the first physical block from the third state to the fifth state, if effective data are written.

27. The method as claimed in claim 23, wherein an erase operation makes a transition of the fifth state to the first state.

* * * * *